Figure 1:
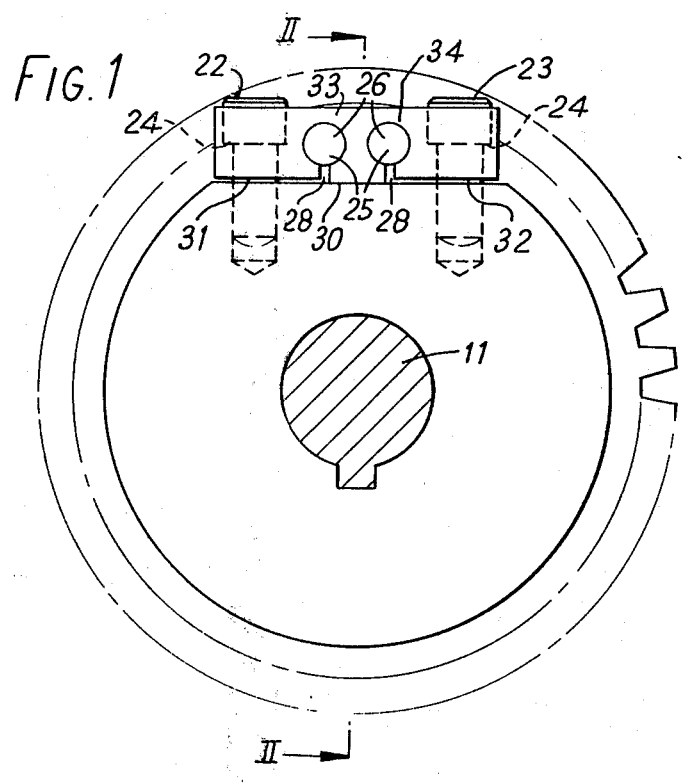

United States Patent [19]

Miles

[11] 3,973,412
[45] Aug. 10, 1976

[54] TORQUE-LIMITING COUPLINGS

[76] Inventor: Howard Price Miles, 1, Glan-y-Nant Close, Cwmbran, England

[22] Filed: Sept. 26, 1975

[21] Appl. No.: 617,089

[30] Foreign Application Priority Data

Sept. 27, 1974 United Kingdom............... 42059/74

[52] U.S. Cl................................................. 64/28 R
[51] Int. Cl.².......................................... F16D 3/58
[58] Field of Search ........................... 64/28 R, 28 M

[56] References Cited
UNITED STATES PATENTS

| | | | |
|---|---|---|---|
| 2,384,188 | 9/1945 | Mercier | 64/28 |
| 2,680,359 | 6/1954 | Bowers | 64/28 |
| 2,797,563 | 7/1957 | Ziemelis | 64/28 |
| 3,683,713 | 8/1972 | Brucher | 64/28 |

*Primary Examiner*—Samuel Scott
*Assistant Examiner*—Randall Heald
*Attorney, Agent, or Firm*—Browdy and Neimark

[57] ABSTRACT

A torque-limiting coupling having two co-axial rotary members interconnected by one or more shear pins extending between two fixing blocks detachably secured one to each of the two rotary members. Each shear pin is firmly secured in bores in the two blocks, and each block is firmly secured by two screws onto a chordal flat on the periphery of each rotary member, so that, in the event of a pin being sheared, the blocks with the broken pin can be removed radially and then replaced with another pin. In a coupling having two or more pins the shear load is distributed equally between the pins. Each pin may be bonded in the bores in the fixing blocks. Alternatively, each pin may be a loose fit in the bores and the block dimensioned so that when it is screwed firmly onto its chordal flat the block is flexed or deformed so as to reduce the diameter of the bore and thereby clamp the shear pin firmly in the bore. One rotary member can be keyed on a shaft and the other rotary member rotatably mounted on the shaft or on a boss on the first rotary member. In another construction, the two rotary members are bonded to the outer and inner races of a ball bearing.

12 Claims, 6 Drawing Figures

U.S. Patent   Aug. 10, 1976   Sheet 1 of 3   3,973,412

TORQUE-LIMITING COUPLINGS

This invention relates to torque-limiting couplings having one or more shear pins for transmitting the load in a mechanical drive system, the pin or pins being designed to shear and thereby disconnect the load when the coupling is subjected to a torque in excess of a predetermined value.

Conventional constructions of a shear pin couplings, although giving excellent overload protection, have the following main disadvantages:

1. Sufficient clearance must be provided between the pin and the wall of the bore in which it is located to permit easy insertion of the pin, but the clearance eventually causes fretting and rusting due to the inadequate support between the pin and the wall of the bore.
2. After shearing, excessive force often has to be used to hammer out the broken pins and as they are usually removed in an axial direction, surrounding machinery often limits the room available for working.
3. It is difficult to arrange for more than one shear pin to carry a torque load due to the extreme accuracy required in locating the supporting bores relative to one another.

The object of the invention is to provide an improved construction of shear pin coupling which is not subject to the above mentioned disadvantages.

According to the present invention there is provided a torque-limiting coupling comprising two co-axial rotary members and a connector unit connecting the two members together for rotation in unison, the connector unit comprising two blocks detachably secured one to each of the two rotary members and at least one shear pin firmly secured in aligned bores in the two blocks and offset from the rotational axis of the rotary members, whereby in the event of the pin or pins being sheared by transmission of torque above a predetermined limiting value, the broken connector unit may be removed from the coupling and replaced by another connector unit without disturbing the rotary members. The two blocks are preferably detachably secured to peripheral portions of the two rotary members, whereby the connector unit may be removed radially from the coupling when the blocks are detached from the rotary members.

In a torque-limiting coupling according to the invention having a connector unit with two or more shear pins, or a torque-limiting coupling having two or more connector units each having one or more shear pins, the torque transmitted by the coupling will be distributed evenly between all the shear pins for the reason that each shear pin is fixedly secured in its fixing block and the block is in turn fixedly secured to its rotary member. The ability to distribute the torque transmitted by the coupling between two or more shear pins provides greater flexibility in adapting the coupling to disconnect a load at a particular value of torque by a suitable selection of shear pins of different shear values. Shear pins of different shear value are preferably identified by a colour coding system.

The use of two or more shear pins in the one coupling has the further advantage that the pins provide greater rigidity in the connection between the two rotary members of the coupling than would be the case if the coupling had only one shear pin of a shear value equal to the aggregate of the shear values of the multiple pin construction.

Each shear pin may be a force fit in its bore in a fixing block, or bonded to the wall of the bore, for example by a liquid polymer such as that sold under the trade name Loctite 35, so that the blocks must be discarded in the event of shear of the pin. This construction has the advantage that the coupling can only be repaired by fitting a complete new connector unit supplied from the manufacturers, and steps can be taken to ensure that the only spare connector units available on site have shear pins of a predetermined shear value.

Alternatively each shear pin may be a loose fit in its bore and the block provided with a slot extending from the wall of the bore to an outer face of the block, the coupling having means for flexing or deforming the part of the block opposite the slot to reduce the diameter of the bore and thereby clamp the shear pin firmly in its bore. The means for flexing the block can conveniently be screws securing the block to the rotary member of the coupling, for example by providing clearance between the rotary member and a part of the block fitted with one of the fixing screws. This construction has the advantage that a shear pin may be removed from the blocks without disconnecting the blocks from the rotary members by slackening the fixing screws so that the blocks will be in an unstressed condition with the pin a loose fit in its bore.

Figure 2:
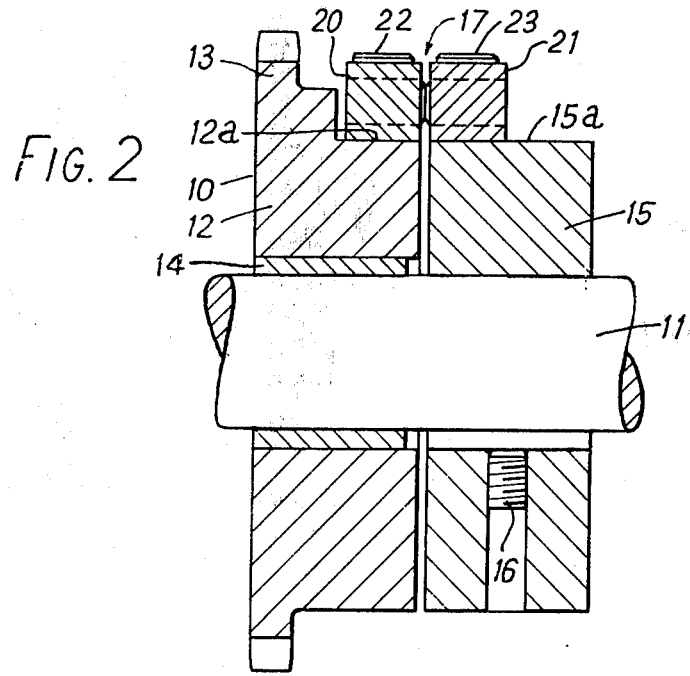
Figure 3:
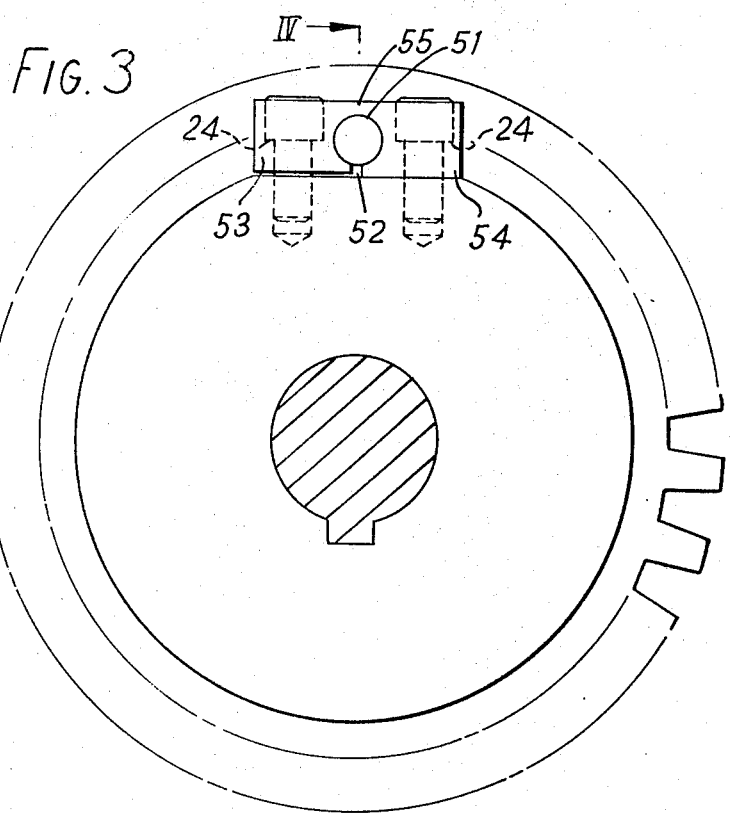
Figure 4:
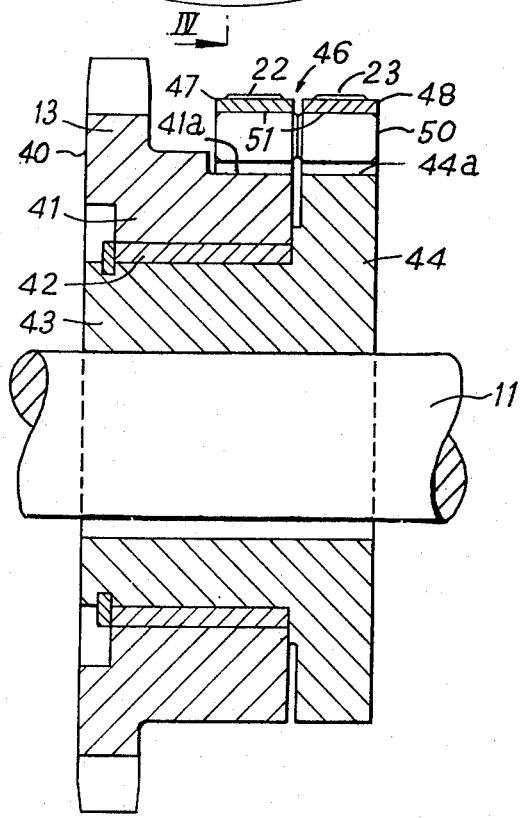
Figure 5:
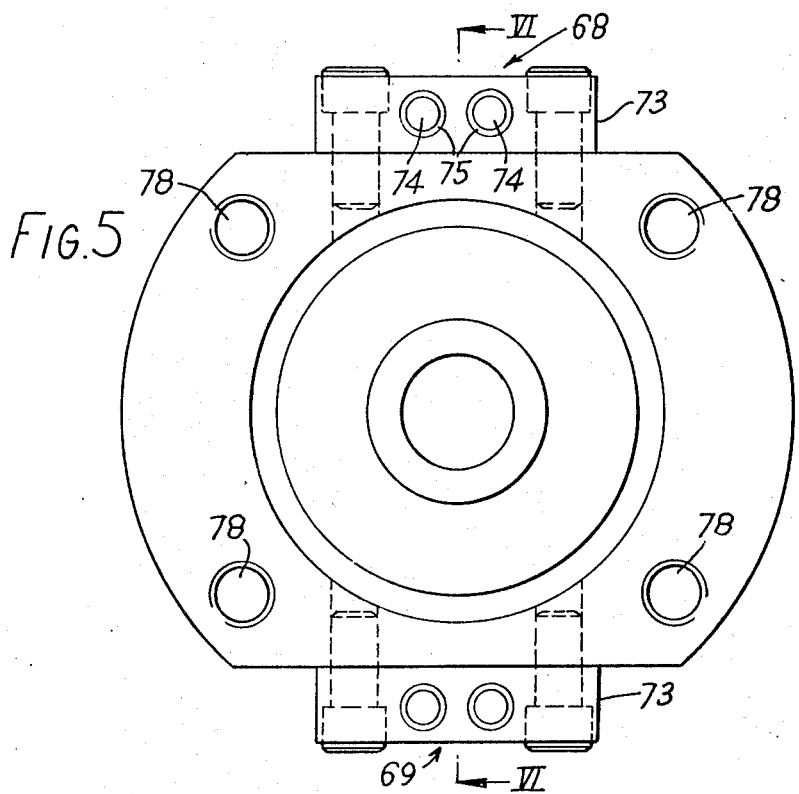
Figure 6:
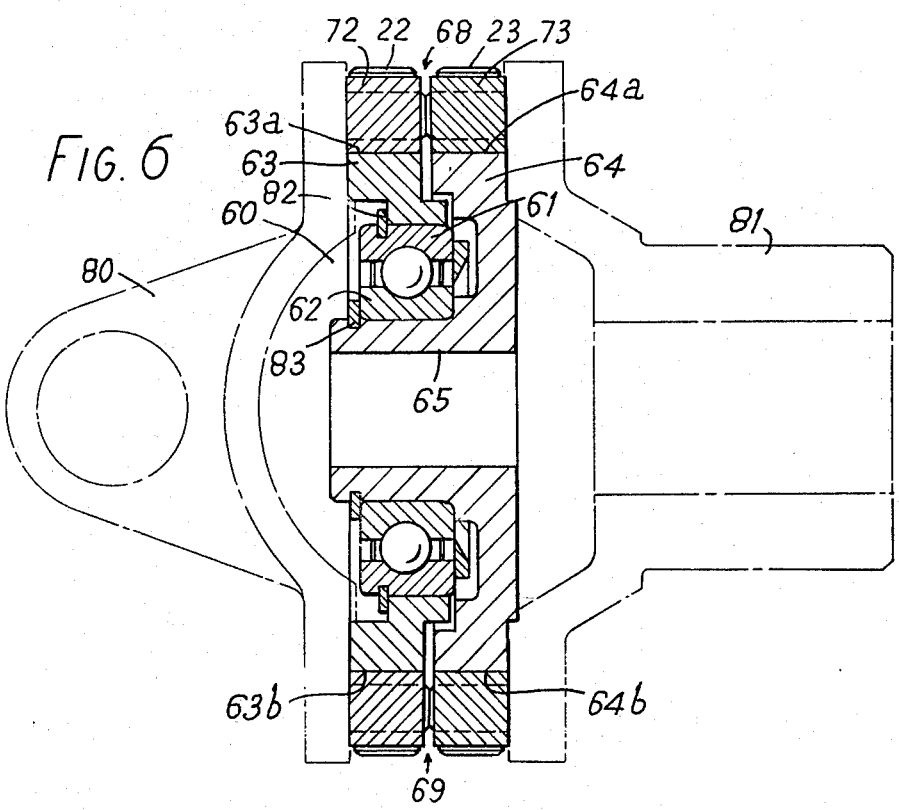

Embodiments of the invention will now be described, by way of example, with reference to the accompanying drawings, in which like reference numerals denote like parts, and in which:

FIG. 1 is a side view of a toothed sprocket fitted with a torque-limiting coupling according to the invention, FIG. 2 is a cross sectional view of the sprocket and coupling of FIG. 1 taken along the line II—II, FIG. 3 is a side view of another construction of toothed sprocket and coupling according to the invention, FIG. 4 is a cross sectional view of the sprocket and coupling of FIG. 3 taken along the line IV—IV, FIG. 5 is a side view of a self-contained torque-limiting coupling according to the invention in which the rotary members of the coupling are mounted on the races of a ball bearing, and FIG. 6 is a cross sectional view of the coupling of FIG. 5 taken along the line VI—VI.

The sprocket 10 shown in FIGS. 1 and 2 is rotatably mounted on a shaft 11 and comprises a cylindrical hub 12 formed at one side thereof with a radial flange 13 in which the teeth of the sprocket are cut, and a bearing bush 14 located in a central aperture in the hub 12, the shaft 11 extending as a rotational fit through the bush 14. A cylindrical driving hub 15 of the same diameter as the hub 12 of the sprocket is keyed onto the shaft 11 on the side of the hub 12 remote from the flange 13, the hub 15 being held in position on the shaft by a grub screw 16, and the two hubs 12, 15 are connected together for rotation in unison by a connector unit 17 mounted on chordal flats 12a, 15a on the hubs 12, 15, the two chordal flats being at the same distance from the axis of the shaft.

The connector unit 17 comprises two metal blocks 20, 21, the block 20 being clamped onto the chordal flat 12a by two screws 22 extending through apertures in the ends of the block, and the block 21 being clamped onto the chordal flat 15a by two screws 23 extending through apertures in the ends of the block. The apertures in the blocks for the screws are stepped to form shoulders 24 against which the heads of the screws abut. The two blocks are flush with the side walls of their associated hubs 12, 15 and arranged side by side with a small gap therebetween. Two shear pins 25 are located in aligned bores 26 in the blocks 20, 21, the part of each shear pin extending across the gap betwen the two blocks being formed with a peripheral V-shaped groove to provide a neck of reduced diameter. The wall of each bore 26 has a longitudinal slot 28 which opens through the bottom face of the block, that is the face adjacent the associated chordal flat 12a or 15a, so that each block is divided into a central portion 30 between the two bores 26, two end portions 31, 32 between each bore 26 and the adjacent end of the block, and two thin bridging portions 33, 34 consisting of the metal betwen the bores 26 and the top face of the block, the two bridging portions 33, 34 connecting the two end portions 31, 32 to the central portion 30. Each block is dimensioned so that the end portions 31, 32 are spaced at a small distance from its chordal flat when the central portion 30 rests on the flat with the block in an unstressed condition. The slots 28 can conveniently be cut by a hacksaw, and each block can conveniently be made from a truly rectangular section of metal and approximately five thousandths of an inch ground away from the bottom faces of the end portions 31, 32 to provide the desired clearance when the central portion is mounted on a chordal flat. The shear pins 25 are a loose sliding fit in the bores 26 when the blocks 20, 21 are in an unstressed condition as shown in FIG. 1.

The sprocket and torque-limiting coupling of FIGS. 1 and 2 is assembled by first mounting the sprocket 10 at the desired position on the shaft 11, securing the driving hub 15 on the shaft 11 in a position such that there is a small gap between the hub 15 and the hub 12 of the sprocket, mounting the two blocks 20, 21 in position on the chordal flats 12a, 15a with the heads of the screws 22, 23 abutting against the shoulders 24 but not exerting any load thereon so that the end portions 31, 32 of the blocks are spaced from the chordal flats. The shear pins 25 are then inserted in the bores 26 with their necks midway between the two blocks, and the screws 22, 23 are screwed firmly down so as to cause downward flexing of the comparatively thin bridge portions 33, 34. This flexing movement causes the end portions 31, 32 to pivot downwards and inwards towards the central portion 30 and thereby decrease the diameters of the bores 26 and cause the shear pins to be firmly clamped to the blocks. The blocks are so dimensioned that the end portions 31, 32 abut against the chordal flats when the bridge portions 33, 34 have been flexed by an amount sufficient to clamp the shear pins securely in the blocks. The shear pins are of course made of a material and to a size such that the shear loads exerted on the two pins at the desired maximum torque between the sprocket and the shaft will cause the pins to facture across their necks and thereby disconnect the driving connection between the two hubs 12, 15.

Shear pins which have been sheared can easily be replaced by slackening off the screws 22, 23 so as to enlarge the bores 26 as explained above, removing the broken pins, turning the sprocket 10 or the shaft 11 to bring the bores 26 in the two blocks into alignment, inserting new shear pins into the bores 26, and retightening the screws 22, 23 to clamp the pins firmly in the blocks. If other components obstruct free axial movement of the shear pins into and out of the bores 26, the two blocks 20, 21 together with the broken shear pins may be removed radially away from the two hubs 12, 15, new shear pins inserted in the two blocks, and the assembly of blocks and shear pins replaced as a unit onto the chordal flats 12a, 15a.

In the arrangement of FIGS. 3 and 4, the sprocket 40 has a cylindrical hub 41 which is rotatably mounted on a bearing bush 42 supported on a boss 43 formed on one side of a cylindrical driving hub 44 splined on the shaft 11. The sprocket 40 has a radial flange 13 formed with the teeth of the sprocket, and the two hubs 41, 44 are of the same diameter and provided with chordal flats 41a, 44a at the same distance from the axis of the shaft, as in the sprocket and coupling assembly of FIGS. 1 and 2.

The two hubs 41, 44 are connected together for rotation in unison by a connector unit 46 consisting of two blocks 47, 48 secured by screws 22, 23 to the chordal flats 41a, 44a respectively, and a single shear pin 50 which extends through aligned bores 51 in the two blocks. The wall of each bore 51 has a longitudinal slot 52 which opens through the bottom face of the block, so that each block is divided into two end portions 53, 54 and a bridging portion 55 consisting of the metal between the bore and the top face of the block. Each block is dimensioned so that one of the end portions 53, 54 is spaced at a small distance from its chordal flat when the other end portion rests on the flat with the block in an unstressed condition (the end portion 53 is spaced from its flat in FIG. 3), and the shear pin is a loose fit within the bores 51 when the block is unstressed. The heads of the screws 22, 23 abut against shoulders 24 in their apertures in the blocks 47, 48 and, as in the arrangement of FIGS. 1 and 2, the bridge portion of each block flexes downwards when the screws 22, 23 are screwed firmly against the shoulders 24, resulting in the end portion 53 pivoting towards the end portion 54 and thereby causing the bore 51 to be reduced in diameter and the shear pin 50 to be clamped firmly to the blocks.

The arrangement of FIGS. 3 and 4 has the advantage over that of FIGS. 1 and 2 in that it is of shorter axial length. The two hubs 41, 44 may of course be connected by two shear pins as shown in FIG. 1, or the two hubs may be connected by two or more pairs of blocks each fitted with one or more shear pins.

The self-contained coupling shown in FIGS. 5 and 6 comprises a conventional sealed ball bearing 60 having an outer race 61 and an inner race 62, an annular flange 63 bonded by a liquid polymer to the outer race 61, and a further annular flange 64 formed with a central boss 65 which extends into and is bonded by a liquid polymer to the inner race 62. The outer peripheries of the two flanges are arranged side by side with a small gap therebetween, the flange 63 is formed with two diametrically opposed chordal flats 63a, 63b, and the flange 64 is formed with two diametrically opposed chordal flats 64a, 64b, all the chordal flats being spaced at the same distance from the axis of the coupling. The two flanges 63, 64 are connected together by two connector units 68, 69, the unit 68 being mounted on the flats 63a, 64a, and the unit 69 being mounted on the flats 63b, 64b.

The two connector units 68, 69 are identical in construction and each comprises two blocks 72, 73 arranged side by side and interconnected by two shear pins 74 located in bores 75 in the two blocks, the shear pins being bonded in place in the bores by a liquid polymer. The block 72 is secured by screws 22 to one of the chordal flats on the flange 63 and the block 73 is secured by screws 23 to the adjacent chordal flat on the flange 64.

The annular flanges 63, 64 are provided with screw threaded apertures 78 for reception of screws (not shown) for securing the flanges 63, 64 to corresponding flanges in a mechanical drive system. The coupling of FIGS. 5 and 6 is particularly suitable for use as a shearing spacer in universal joint or gear coupling drives, and FIG. 6 shows in broken lines an element 80 of a universal joint drivably connected to a splined sleeve 81 by the ball bearing coupling. In the event of the shear pins 74 being sheared by excessive torque, the two flanges 63, 64 are located axially relative to one another by the ball bearing 60 and are of course free to rotate relative to one another. As a precaution in case the bond between the flanges 63, 64 and the ball races 61, 62 may fail in the event of high stresses resulting from shearing of the pins 74, the outer race is preferably provided with a circlip 82 preventing axial separation of the outer race and the flange 63, and the boss 65 is preferably provided with a circlip 83 preventing axial separation of the boss and the flange 64.

In the event of shear of the pins 74, the screws 22, 23 and the blocks 72, 73 together with the broken pins are removed in a radial direction, and new connector units secured in position on the flanges 63, 64 by the screws 22, 23.

What I claim is:

1. A torque-limiting coupling comprising two coaxial rotary members and a connector unit connecting the two members together for rotation in unison, the connector unit comprising two blocks detachably secured one to each of the two rotary members and at least one shear pin firmly secured in aligned bores in the two blocks and offset from the rotational axis of the rotary members, whereby in the event of the pin or pins being sheared by transmission of torque above a predetermined limiting value, the broken connector unit may be removed from the coupling and replaced by another connector unit without disturbing the rotary members.

2. A torque-limiting coupling as claimed in claim 1, wherein the two blocks are detachably secured to peripheral portions of the two rotary members, whereby the connector unit may be removed radially from the coupling when the blocks are detached from the rotary members.

3. A torque-limiting coupling as claimed in claim 2, wherein the periphery of each rotary member is formed with a chordal flat, and the blocks are mounted on the chordal flats.

4. A torque-limiting coupling as claimed in claim 3, wherein the shear pin is bonded to the walls of the bores in the blocks.

5. A torque-limiting coupling as claimed in claim 3, wherein each block is formed with a slot extending from said bore to an outer face of the block, the coupling having means for flexing the part of the block opposite the slot to reduce the diameter of the bore and thereby clamp the shear pin firmly in its bore.

6. A torque-limiting coupling as claimed in claim 5, wherein the means for flexing the block comprises screws for securing the block to its associated rotary member.

7. A torque-limiting coupling as claimed in claim 6, in which each block is mounted on said chordal flat on its associated rotary member by two screws extending through apertures in opposite end portions of the block, and a single shear pin is mounted in a bore in the central portion of the block, wherein said block is formed with a longitudinal slot extending from the wall of the bore to the bottom face of the block, the block is so dimensioned that the part of the block between said bore and one end thereof is spaced with small clearance from said chordal flat when the remainder of the block rests in an unstressed condition on the chordal flat, and the shear pin is so dimensioned that it is a loose fit in the bore when the block is unstressed but is securely clamped therein when the block is flexed upon being screwed firmly onto the chordal flat.

8. A torque-limiting coupling as claimed in claim 6, in which each block is mounted on said chordal flat on its associated rotary member by two screws extending through apertures in opposite end portions of the block, and two shear pins are mounted in bores in the central portion of the block, wherein said block is formed with longitudinal slots extending from the walls of the bores to the bottom face of the block, the block is so dimensioned that the end portions of the block are spaced with small clearance from the chordal flat when the central portion of the block rests in an unstressed condition on the chordal flat, and the shear pins are so dimensioned that each pin is a loose fit in its bore when the block is unstressed but is securely clamped therein when the block is flexed upon screwing it firmly onto the chordal flat.

9. A torque-limiting coupling as claimed in claim 1, wherein the two rotary members are secured to the inner and outer races respectively of a ball bearing.

10. A torque-limiting coupling as claimed in claim 1, wherein one of said rotary members is formed with a central boss, and the other rotary members is rotatably mounted on said boss.

11. A torque-limiting coupling comprising two coaxial rotary members, at least two fixing blocks detachably secured one on each of said rotary members, and a plurality of shear pins firmly secured in bores in said blocks and adapted to transmit torque between said rotary members.

12. A torque-limiting coupling as claimed in claim 11, wherein each rotary member is formed with two diametrically-opposed chordal flats, and four fixing blocks are secured one on each of the said flats on the two rotary members, each fixing block on one rotary member being connected to an adjacent block on the other rotary member by at least one of said shear pins having opposite ends thereof firmly secured in bores in the blocks.

* * * * *